(12) United States Patent
Li

(10) Patent No.: US 6,694,781 B1
(45) Date of Patent: Feb. 24, 2004

(54) TOW-DETERRENT LOCK FOR CAMPING TRAILERS

(75) Inventor: Show-Mon Li, Changhua (TW)

(73) Assignee: Vulcan Sports Co., Ltd., Changhua (TW)

( * ) Notice: Subject to any disclaimer, the term of this patent is extended or adjusted under 35 U.S.C. 154(b) by 0 days.

(21) Appl. No.: 10/442,146

(22) Filed: May 21, 2003

(51) Int. Cl.[7] .............................................. B60R 25/00
(52) U.S. Cl. .............................. 70/14; 70/18; 70/38 A; 70/39; 70/258; 280/507
(58) Field of Search .............................. 70/14, 18, 19, 70/38 A, 39, 58, 258, 232, 237, 234, 235; 280/507, 511, 513; 248/551–553

(56) References Cited

U.S. PATENT DOCUMENTS

| | | | |
|---|---|---|---|
| 2,700,289 A | * 1/1955 | Morgan | 70/14 |
| 3,924,878 A | * 12/1975 | Utman et al. | 280/507 |
| 4,032,171 A | * 6/1977 | Allen et al. | 280/507 |
| 4,836,570 A | * 6/1989 | Lopez et al. | 280/507 |
| 5,042,754 A | * 8/1991 | Heath | 244/224 |
| 5,087,064 A | * 2/1992 | Guhlin | 280/507 |
| 5,094,423 A | * 3/1992 | Almquist et al. | 248/552 |
| 5,394,712 A | * 3/1995 | Chou | 70/38 A |
| 5,417,092 A | * 5/1995 | Iu | 70/38 A |
| 5,700,024 A | * 12/1997 | Upchurch | 280/507 |
| 5,873,271 A | * 2/1999 | Smith | 70/58 |
| 6,155,589 A | * 12/2000 | Simpson | 280/507 |
| 6,412,313 B1 | * 7/2002 | Bernstrom | 70/14 |

FOREIGN PATENT DOCUMENTS

| | | | | |
|---|---|---|---|---|
| GB | 1206333 | * | 9/1970 | 70/14 |
| GB | 1350086 | * | 4/1974 | 70/18 |

* cited by examiner

Primary Examiner—Llyod A. Gall
(74) Attorney, Agent, or Firm—Troxell Law Office PLLC

(57) ABSTRACT

A tow-deterrent lock for camping trailers includes a latch assembly and a latch bolt dock coupling with each other. The latch bolt dock has a transverse beam on one end that has an inner side bonding to a spherical shell which has a housing chamber with an opening. When a coupling dock extending from a camping trailer is coupled with a towing rod of a vehicle, the housing chamber of the spherical shell may house a fastening nut located below the towing rod to couple with the latch bolt dock and latch assembly to confine and lock the coupling dock and the lower end of the spherical head rod to form a theft-proof protection. When the camping trailer is not coupled with the vehicle, the spherical shell may be wedged into a spherical trough of the coupling dock to couple with the latch bolt dock and latch assembly to lock the coupling dock and form a theft-proof protection. Thus the invention can provide locking and theft-proof function in two use conditions.

2 Claims, 9 Drawing Sheets

TOW-DETERRENT LOCK FOR CAMPING TRAILERS

BACKGROUND OF THE INVENTION

1. Field of the Invention

The invention relates to a tow-deterrent lock for camping trailer and particularly to a theft-proof and tow-deterrent lock for camping trailers to prevent the camping trailers from stolen and hauled away in two use conditions before and after being coupled with a vehicle.

2. Description of the Prior Art

Refer to FIG. 1 for a conventional tow-deterrent lock 5. It includes a body 51 which has a sphere 511 located thereon to couple with a U-shaped shackle 52 to achieve lock function. When the camping trailer is not coupled with the vehicle, the sphere 511 may be disposed in a spherical trough 612 of a coupling dock 61 of the camping trailers, then the U-shaped shackle 52 may be inserted into the body 51 from above to form a lock condition (as shown in FIG. 2) to prevent the trailer from being stolen and hauled away. However, such a tow-deterrent lock is applicable only to the camping trailers which is not yet being coupled with the vehicle. Once the camping trailer has been coupled with the vehicle, the conventional tow-deterrent lock 5 does not have lock function. The tow-deterrent locks now on the market generally do not provide dual usage theft-proof functions. Hence once a theft unfasten the coupling of the coupling dock 61 and the camping trailers (no lock is applied), the camping trailers may be hauled away easily.

SUMMARY OF THE INVENTION

In view of the aforesaid disadvantages, the primary object of the invention is to provide a tow-deterrent lock for camping trailers that can form a locking and retaining condition when the coupling dock extended from the camping trailers is coupled with the towing rod of the vehicle.

Another object of the invention is to provide a tow-deterrent lock for camping trailers that can form a locking condition when the coupling dock of the camping trailers is not coupled with the vehicle so that the coupling dock cannot be coupled with other vehicle to prevent the camping trailers from being hauled away improperly.

In order to achieve the foregoing objects, the invention mainly includes an elongated latch assembly which has two ends forming respectively an insert hub with an insert hole to couple with a corresponding latch bolt dock. The latch bolt dock has a transverse beam with an inner side bonding to a spherical shell which has a housing chamber with an opening. The coupling dock extended from the camping trailers may be coupled with a towing rod of a vehicle with the housing chamber holding a nut fastened to the lower end of a spherical head, then the latch bolt dock and the latch assembly may be used to couple and lock the coupling dock and the lower end of the spherical head. When the camping trailer is not yet coupled with the vehicle, the spherical shell may be embedded into a spherical trough of the coupling dock of the camping trailer to prevent improper locking and towing. Therefore, the invention can provide theft-proof function in both conditions.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
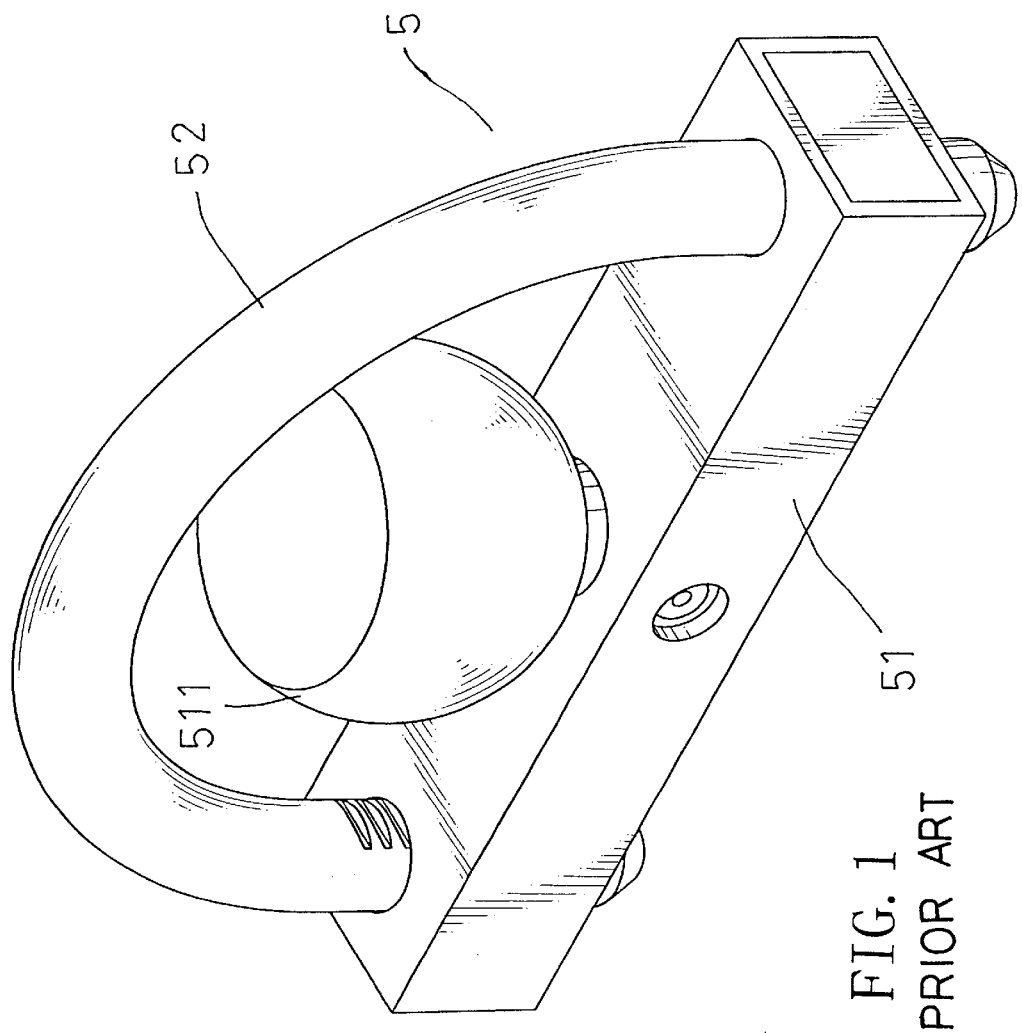
FIG. 1 is a perspective view of a conventional tow-deterrent lock.
Figure 2:
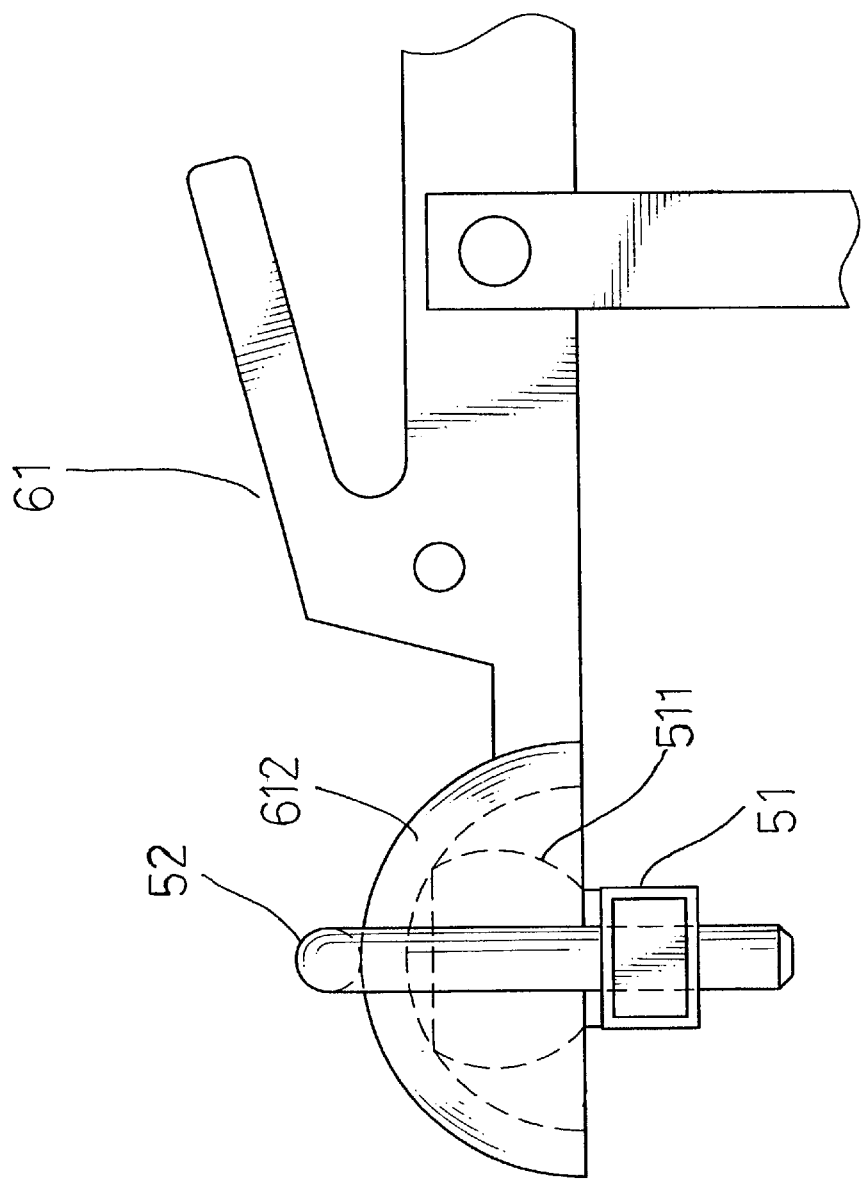
FIG. 2 is a schematic view of an embodiment of a conventional tow-deterrent lock.
Figure 3:
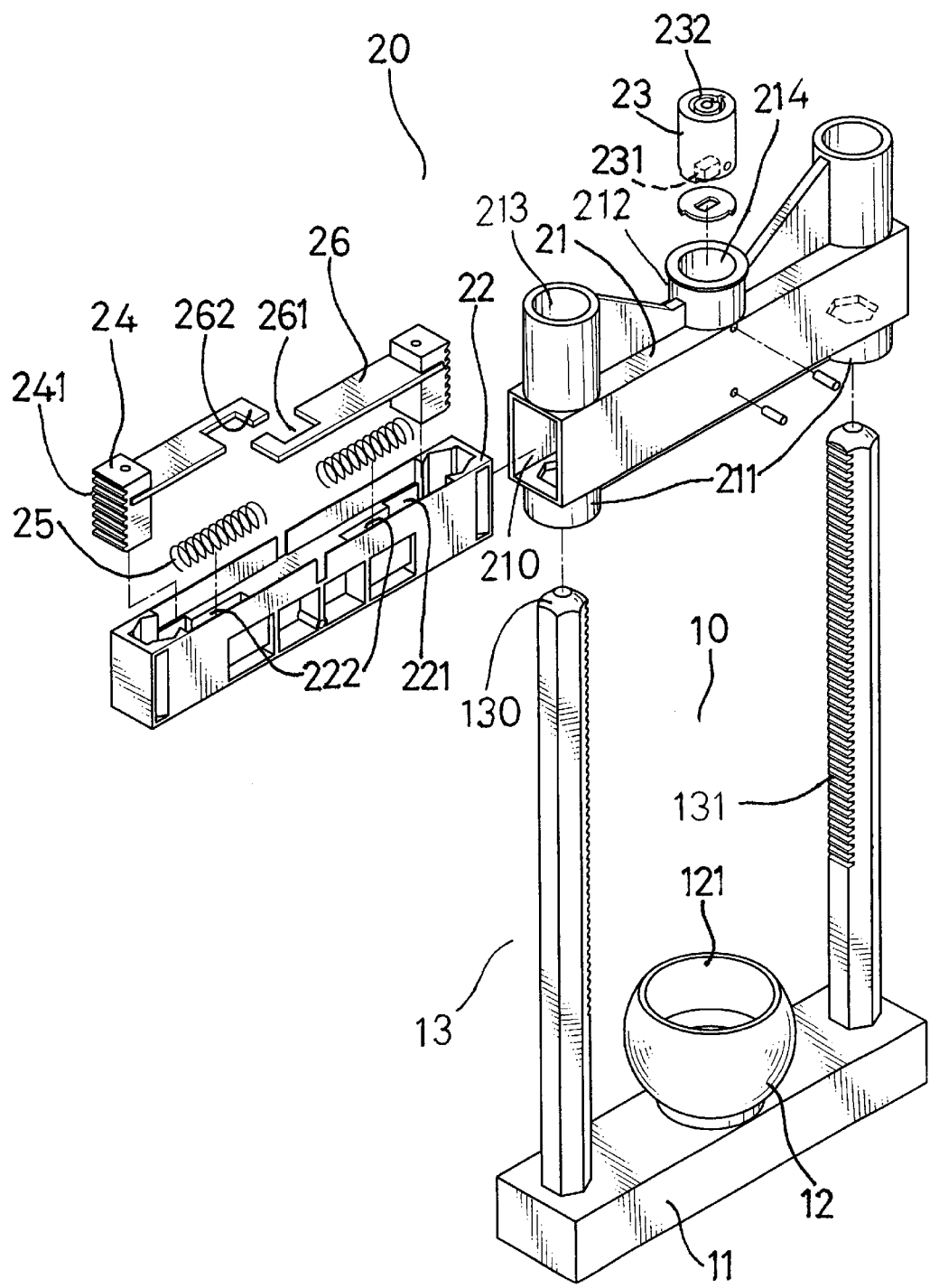
FIG. 3 is an exploded view of the invention.

Referring to FIG. 3, the invention mainly includes a latch bolt dock 10 and a latch assembly 20.

The latch bolt dock 10 has a transverse beam 11 which has an inner side bonding to a spherical shell 12 in the middle. The spherical shell 12 has a housing chamber 121 which has an opening directing upwards. The transverse beam 11 has two sides fastened to two upright and parallel latch bolts 13 which have a distal end to form an insert end 130. Each of the latch bolts 13 has an inner side forming a first gear rack 131 which has teeth biased in one direction.

The latch assembly 20 includes a case 21, a latch plug 22, a latch core 23, two latch members 24, two springs 25 and two sliding plates 26.

The case 21 is hollow and has two openings 210 formed at two ends and two insert hubs 211 located on two sides. Each insert hub 211 has an insert hole 213. The case 21 further has a core seat 212 extending upwards from the center of an upper side. The core seat 212 has a core opening 214.

The latch plug 22 is housed in the hollow interior of the case 21 and has two troughs 221 at two ends for housing the latch members. The troughs 221 have respectively an inner side extended to form a spring trough 222.

The latch core 23 is housed in the core opening 214 of the core seat 212 and has a latch tongue 231 at the lower end and a key way 232 on other side to receive a key.

The latch members 24 are housed respectively in the troughs 221 at two ends of the latch plug 22. Each latch member 24 has an outer side forming a second gear rack 241 with teeth biased one direction to engage with the first gear rack 131 of the latch bolt 13.

The springs 25 are housed in the spring troughs 222 of the latch plug 22 and have elastic forces to push the latch members 24 outwards in normal conditions.

The sliding plates 26 have respectively an inner end forming a notch 261 and a trigger flange 262 positioned in an inverse manner against each other. The sliding plates 26 have an outer end fastened to the latch members 24.

Figure 4:
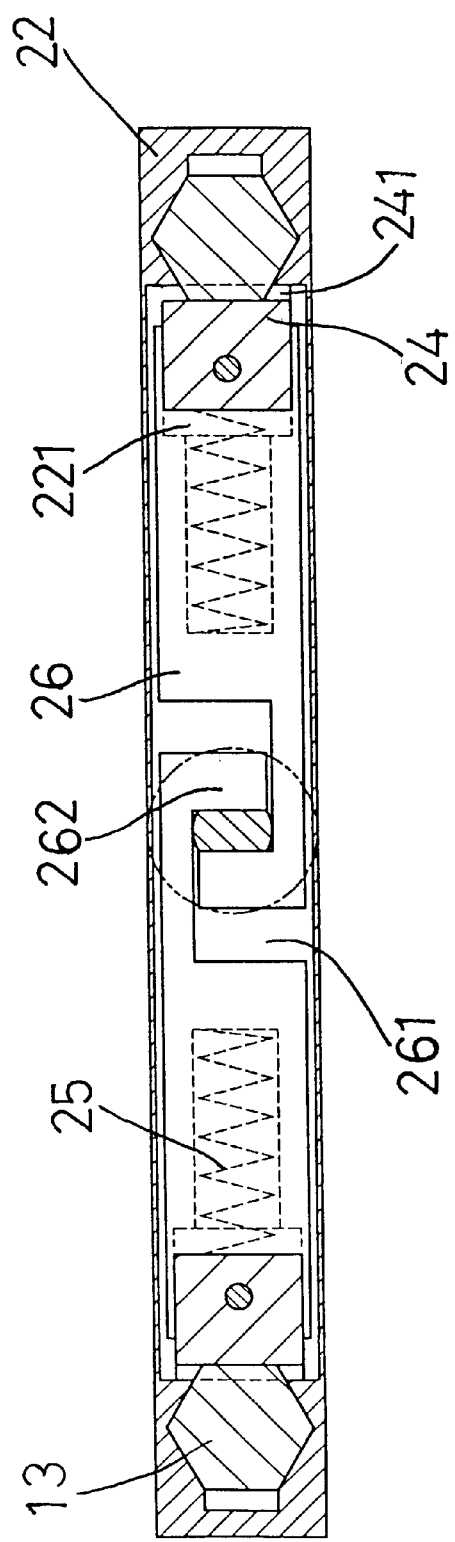
FIG. 4 is a sectional view of the invention in an assembled condition.
Figure 5:
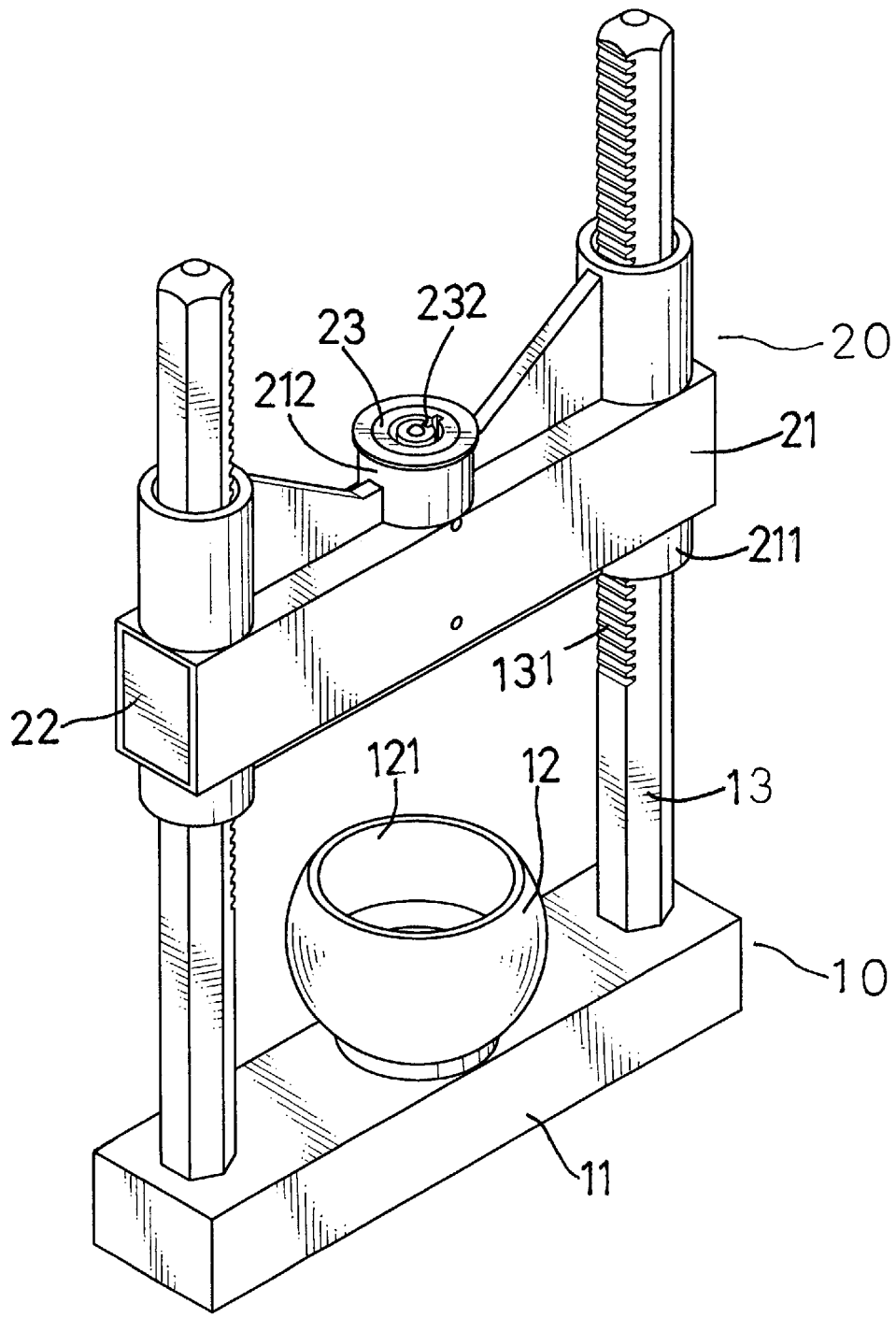
FIG. 5 is a perspective view of the invention in an assembled condition.

Referring to FIG. 4, for assembly, first, place the springs 25 into the spring troughs 222 of the latch plug 22; next, dispose the latch members 24 that have fastened to the sliding plates 26 into the troughs 221 of the latch plug 22, with the notches 261 and trigger flanges 262 positioned in inversely against each other, and the latch members 24 are pushed by the springs 25 outwards in normal conditions;

insert the latch plug 22 into the case 21 to position the opening formed by the inverse notches 261 of the sliding plates 26 matching the location of the core opening 214 of the case 21, then disposed the latch core 23 into the core opening 214 to make the latch tongue 231 wedging in the opening formed by the inverse notches 261. Thus form the latch assembly 20. Then the insert end 130 of the latch bolt dock 10 may be inserted through the insert hub 211 of the case 21 to allow the first gear rack 131 to engage with the second gear rack 241 of the latch members 24 to form a coupling condition as shown in FIG. 5.

Figure 6:
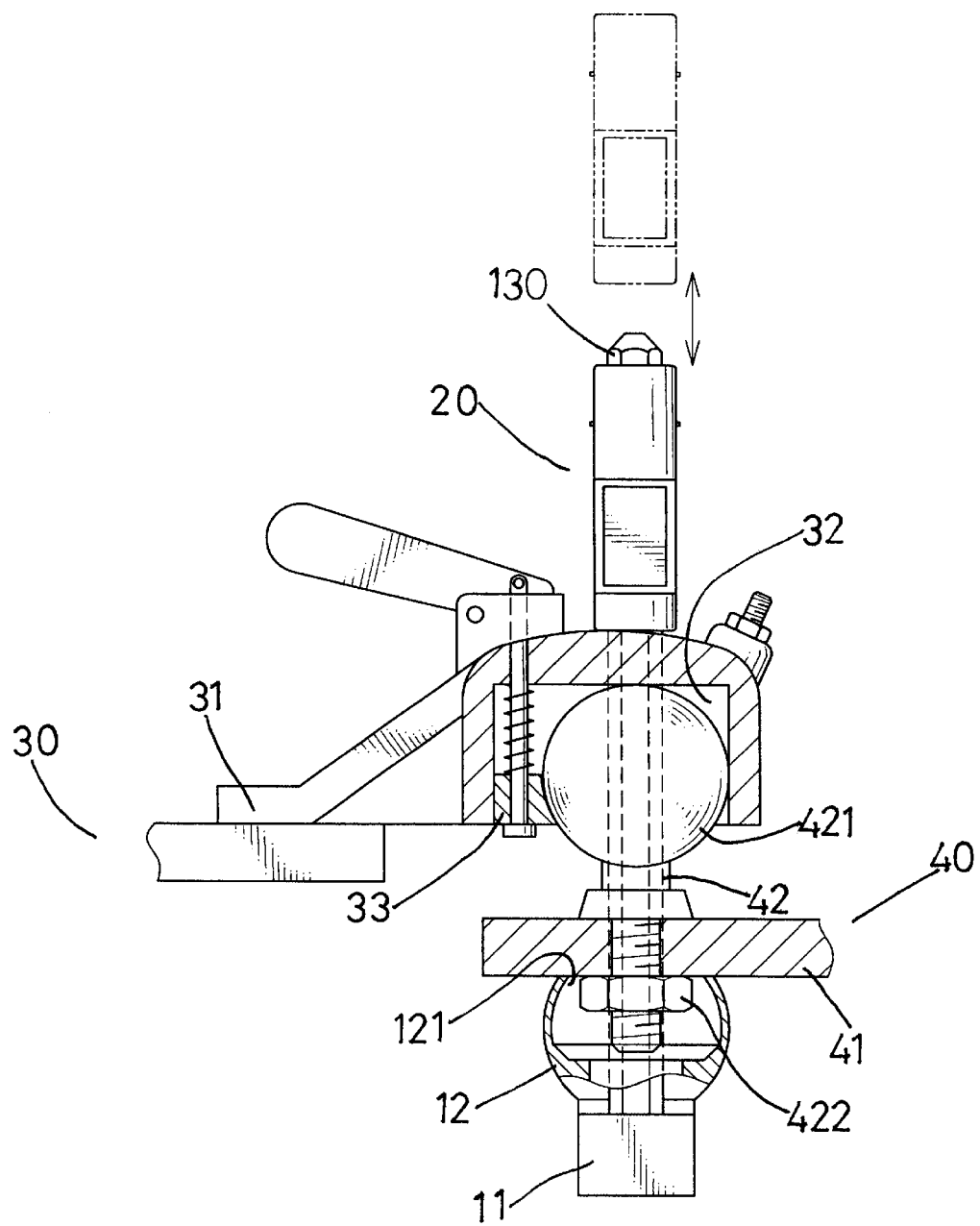
FIG. 6 is a sectional view of the invention in a locked condition when the camping trailers and vehicle are coupled.

Refer to FIG. 6 for the invention in a locked condition when the camping trailers and vehicle are coupled. The coupling dock 31 extended from a camping trailer 30 has a distal end bonding to a spherical trough 32 which has an elastic retaining block 33. To couple for towing the camping trailers, first, push the elastic retaining block 33 downwards outside and below the spherical trough 32; then insert a sphere head 421 located on the distal end of the sphere head rod 42 at the end of the towing rod 41 of a vehicle 40 into the spherical trough 32 of the coupling dock 31 of the camping trailer 30; move the elastic retaining block 33 to its original position to confine the sphere head 421. It becomes a coupled condition for towing. To achieve theft-prevention effect, house the fastening nut 422 located on a lower end of the spherical head rod 42 in the housing chamber 121 of the spherical shell 12 of the transverse beam 11, then fasten the latch bolt 10 and latch assembly 20 to couple and latch the coupling dock 31 and the lower end of the spherical head rod 42 to form a theft-proof locking condition.

Figure 7:
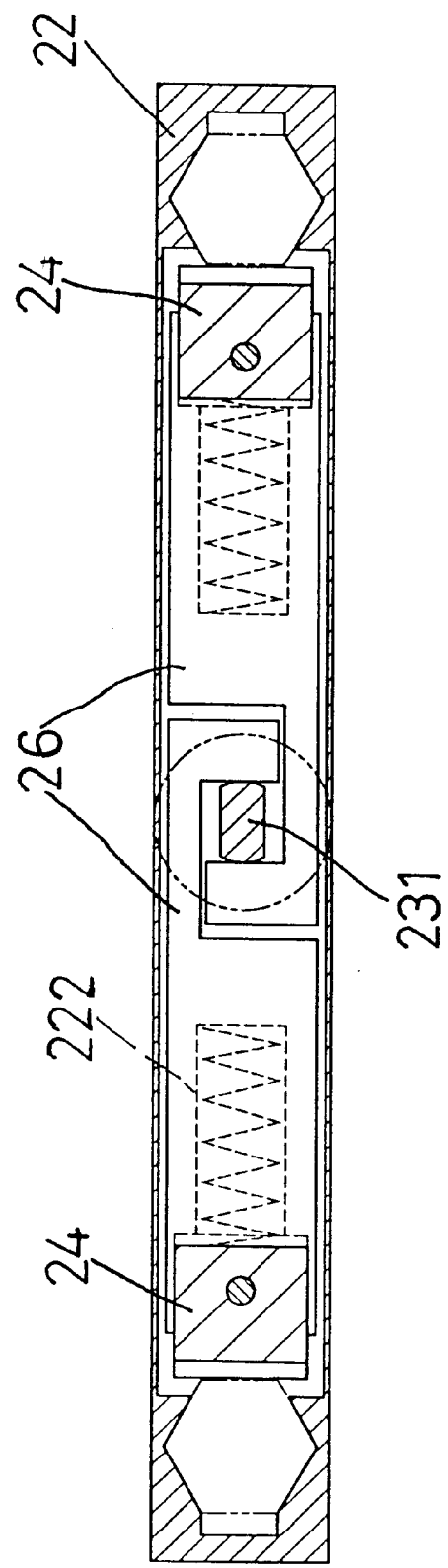
FIG. 7 is a transverse sectional view of the invention in a unlocking condition.
Figure 8:
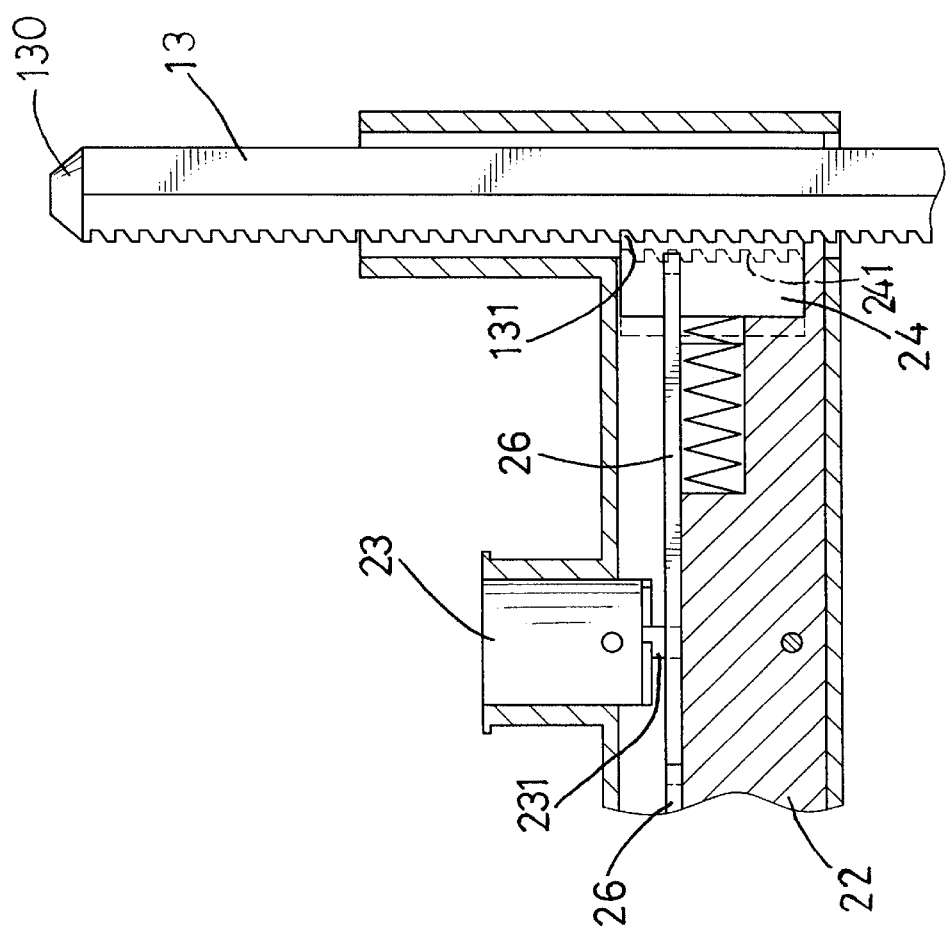
FIG. 8 is a cross section of the invention in a unlocking condition.

Refer to FIGS. 7 and 8 for the invention in unlocking operations. Insert a key into the latch core 23 to turn and drive the latch tongue 231, the two sliding plates 26 may be moved to drive the two latch members 24 inwards to separate and disengage from the first gear rack 131 of the parallel latch bolts 13 of the latch bolt dock 10. Then the latch bolt dock 10 may be removed from the latch assembly 20 to accomplish unlocking.

Figure 9:
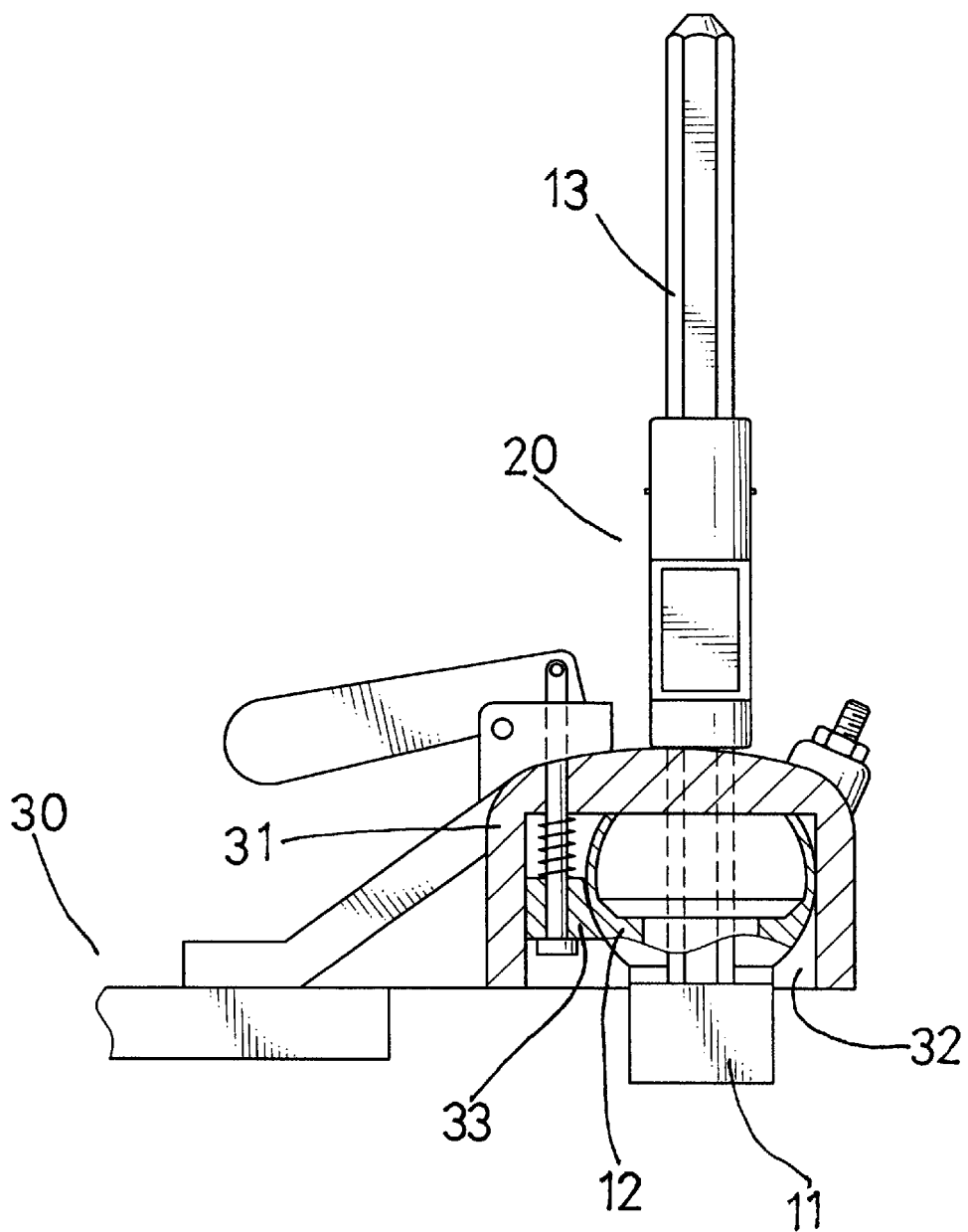
FIG. 9 is a sectional view of the invention in a locked condition when the camping trailers and vehicle are uncoupled.

Refer to FIG. 9 for the invention in a locked condition when the camping trailer and vehicle are uncoupled. When the coupling dock 31 of the camping trailers is not coupled with the towing rod 41 of the vehicle 40, the elastic retaining block 33 may be pushed downwards outside and below the spherical trough 32, then the spherical shell 12 of the transverse beam 11 may be wedged into the spherical trough 32 of the coupling dock 31 of the camping trailer 30, and the elastic retaining block 33 may be pushed to its original position to confine and retain the spherical shell 12. And the latch bolt dock 10 may be fastened to the latch assembly 20 to lock the coupling dock 31 to prevent other vehicles from coupling on the coupling dock or towing the camping trailers improperly.

By means of the construction set forth above, the tow-deterrent lock for camping trailer of the invention can provide lock function in both conditions where the camping trailer is coupled or not coupled with the vehicle to achieve theft-proof function.

I claim:

1. A tow-deterrent lock for camping trailers comprising a latch bolt dock and a latch assembly, wherein:

the latch dock has a transverse beam which has an inner side at two ends coupled with two parallel and upright latch bolts and a middle bonded to a spherical shell, the spherical shell having a housing chamber which has an opening directing upwards; and the latch assembly includes a case, a latch plug, a latch core, two latch members, two springs and two sliding plates, wherein the case is hollow and has two openings formed at two ends and two insert hubs located on two sides thereof, each insert hub having an insert hole, the case further has a core opening extended from the center thereof;

the latch plug is housed in the hollow interior of the case and has two troughs at two ends, each troughs having an inner side extended to form a spring trough;

the latch core is housed in the core opening of the case and has a latch tongue at a lower end and a key way on other side to receive a key;

the latch members are housed in the troughs at two ends of the latch plug, each latch member having an outer side formed with a second gear rack with teeth biased in one direction to engage with a first gear rack of the latch bolt;

the springs are housed in the spring troughs of the latch plug and have elastic forces to push the latch members outwards in normal conditions; and the sliding plates have respectively an inner end forming a notch and a trigger flange positioned inversely, and an outer end fastened to the latch member.

2. The tow-deterrent lock for camping trailers of claim 1, wherein the first gear rack is located on an inner side of the latch bolt.

\* \* \* \* \*